Nov. 14, 1933.  G. WIETZEL ET AL  1,934,836
PROCESS FOR THE CATALYTIC CONVERSION OF HYDROCARBONS
Filed Oct. 15, 1927
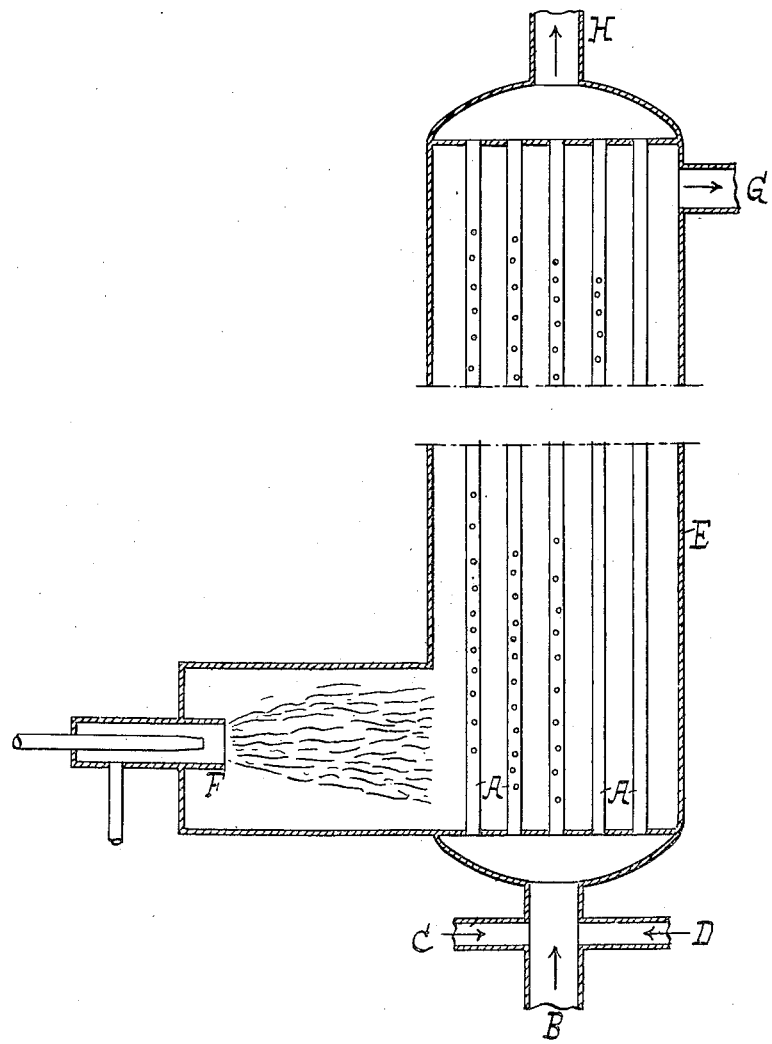
Gustav Wietzel
Wilhelm Haller
William Hennicke
INVENTORS
BY
ATTORNEYS Patented Nov. 14, 1933

1,934,836

UNITED STATES PATENT OFFICE

1,934,836

PROCESS FOR THE CATALYTIC CONVERSION OF HYDROCARBONS

Gustav Wietzel, Wilhelm Haller, and William Hennicke, Ludwigshafen-on-the-Rhine, Germany, assignors to I. G. Farbenindustrie Aktiengesellschaft, Frankfort-on-the-Main, Germany, a corporation of Germany Application October 15, 1927, Serial No. 226,436, and in Germany November 26, 1926

4 Claims. (Cl. 23—7)

Hydrocarbons can be converted into mixtures of carbon monoxid and hydrogen, by passing them together with water vapor or carbon dioxid with or without the addition of air or oxygen or both over catalysts, at elevated temperatures. These reactions are, as is well known, highly endothermic, and as they only take place at elevated temperatures, it is difficult to heat the reacting materials to the necessary extent.

We have now found that no difficulties are encountered in carrying out the process, if the catalysts, for example nickel activated with alumina, are arranged in externally heated long chambers, the walls of which consist of a material of high heat conductivity which is resistant to high temperatures, for example of highly alloyed steels, especially of chromium nickel steel or high-grade nickel alloys, such as chromium nickel. Under these conditions the process can be carried out at temperatures below 1000°C. As long chambers may be employed, for instance, tubes with not too large a cross-sectional area, for instance with a cross-sectional area of 100 square centimetres or less. For example a reaction vessel similar to a tube boiler may be employed, and the contact substances may be arranged either within the tubes, in which case a heating medium, for example hot combustion gases, is conducted through the space surrounding the tubes, or vice versa. An apparatus of this kind is illustrated by way of example in the accompanying diagrammatic drawing which shows one mode of carrying out the invention, to which, however, our invention is not limited.

The catalyst is arranged in a system of tubes A to which the hydrocarbons are admitted at B. The pipes C and D serve for admitting steam and carbon dioxid, air or oxygen, respectively. The tubes A are arranged in a vessel E through which hot combustion gases from the burner F are passed, which leave the vessel E at C. The gases leaving the catalyst tubes A are discharged at H.

When using not activated catalysts, and in the case of very impure initial gases or vapors, it is beneficial to work with the hydrocarbons and the heating medium in a counter current. But when employing activated catalysts, for example catalysts activated by alumina, and pure initial substances, it is best to pass the gases in the same direction as the heating medium. If mainly hydrogen and no carbon monoxid is to be produced, such catalysts as accelerate the conversion of carbon monoxid by means of steam, for example catalysts containing iron oxid and chromium oxid, may be mixed with the whole of the catalyst or only with the latter part of the same.

If the initial substances are very much polluted, especially with organic compounds of sulfur, these must be removed, which may be effected, for instance, by passing the gas over a metallic mass, which absorbs the compounds of sulfur, for example copper, or over a contact substance, which converts the organic sulfur compounds into hydrogen sulfid, for instance over metal oxids heated to about 300° C. and removing the hydrogen sulfid in any suitable manner, or according to any other known or suitable process.

Other gases, especially oxygen or air, may also be added to the mixture of hydrocarbons and steam or carbon dioxid, and the process may also be carried out in two stages in accordance with our copending application for Patent Ser. No. 201,558, filed June 25, 1927, the reacting materials being in the first stage subjected to partial combustion at high temperatures, if desired with the addition of steam, in such a manner, that the resulting gas mixtures still contains an appreciable amount of hydrocarbons, and this mixture is then completely converted in the second stage in the manner described above at a lower temperature.

Whereas the hitherto known processes for the production of hydrogen by conversion of hydrocarbons with steam could only be carried out intermittently for the reason that the necessary heat had to be supplied by means of periodically heated heat-exchangers, the process according to the present invention may be effected in a continuous manner. The employment of catalysts, in particular in the activated form, combined with the use of longitudinal reaction spaces filled with the said catalysts and which are constructed of highly heat resistant and highly heat conducting materials have made it possible to carry out the process at not too high temperatures, i. e. at below 1000° C., and by this to carry out the said conversion on an industrial scale.

The following examples will further illustrate how this invention may be carried out in practice, but the invention is not limited to these examples.

Example 1

50 cubic metres of illuminating gas containing about 3 per cent of carbon dioxid, 2 per cent of heavy hydrocarbons, 6 per cent of carbon monoxid, 52 per cent of hydrogen, 31 per cent of methane and 6 per cent of nitrogen, are passed with about 100 kilograms of steam, preferably superheated, over a catalyst consisting of nickel activated with alumina, which is arranged in tubes of a highly alloyed steel externally heated to between 800° and 900° C. A gas consisting of about 14.5 per cent of carbon dioxid, 78 per cent of hydrogen, 4.6 per cent of carbon monoxid, 0.2 per cent of methane and 2.7 per cent of nitrogen is obtained.

Example 2

Illuminating gas which has been freed from hydrogen sulfid and benzene and is saturated with water vapor is passed at 400° over a catalyst containing iron oxid and chromium oxid and the hydrogen sulfid thus produced from the organic sulfur compounds is removed by means of active charcoal. A gas is thus obtained having approximately the following composition: 3 per cent of carbon dioxid, 2 per cent of heavy hydrocarbons, 6 per cent of carbon monoxid, 52 per cent of hydrogen, 31 per cent of methane and 6 per cent of nitrogen. This mixture is allowed to react at about 600° in the presence of a nickel catalyst activated with alumina with from two to three times the amount of steam necessary for the decomposition of the methane, and then contains approximately: 14.5 per cent of carbon dioxid, 78.0 per cent of hydrogen, 4.6 per cent of carbon monoxid, 0.2 per cent of methane and 2.7 per cent of nitrogen.

Example 3

Illuminating gas, which has been freed from hydrogen sulfid and benezene, is passed over iron oxid activated with chromium oxid at 300° C. in order to remove the organic compounds of sulfur, and the gas mixture thus obtained is, by being passed over a nickel catalyst activated with elumina at from 700° to 800° C. with from two to three times the amount of steam necessary for the decomposition of the methane, converted into a mixture having the following composition: 12.6 per cent of carbon dioxid, 77.5 per cent of hydrogen, 7.0 per cent of carbon monoxid, 0.2 per cent of methane, 2.7 per cent of nitrogen. If the organic compounds of sulfur are not previously removed, the employment of temperatures of about 1000° C. is necessary under like conditions in order to obtain a satisfactory conversion.

Example 4

44 cubic metres of illuminating gas containing about 30 per cent of hydrocarbons is subjected to partial combustion with 11 cubic metres of oxygen and 12 kilograms of steam. The resulting gas which contains about 8 per cent of carbon dioxid, 60 per cent of hydrogen, 19 per cent of carbon monoxid, 7 per cent of methane and 6 per cent of nitrogen, is then passed together with 18 kilograms of steam through the afore-described tube system filled with a nickel catalyst and heated to 600°, whereby a gas mixture containing 20 per cent of carbon dioxid, 72 per cent of hydrogen, 3.6 per cent of carbon monoxid, 0.4 per cent of methane and 4 per cent of nitrogen is obtained.

What we claim is:

1. In the process for the production of gases containing hydrogen by the catalytic conversion of hydrocarbons by steam at elevated temperatures, the step which comprises continuously passing the said initial materials over an activated catalyst arranged in a vertical space having a length very large in proportion to its cross-sectional area and confined by a surface consisting of a highly alloyed steel which is externally heated to a temperature ranging between about 600° and 1000° C.

2. A process for converting hydrocarbons into gases containing hydrogen which comprises confining an activated catalyst promoting said conversion into a plurality of vertical spaces each of which has a length very large in proportion to its cross-sectional area and is defined by walls of a highly alloyed steel, continuously passing through said spaces and over said catalyst a mixture of said hydrocarbons and steam at a temperature of from 600° to 1000° C. to effect a continuous interaction between said steam and hydrocarbons, and passing about said spaces a heating medium sufficiently hot to set up and maintain said temperature.

3. A process for converting hydrocarbons into gases containing hydrogen which comprises confining a nickel catalyst activated with alumina in a plurality of vertical spaces each of which has a length very large in proportion to its cross-sectional area and is defined by walls of a chromium steel, continuously passing through said spaces and over said catalyst a mixture of said hydrocarbons and steam at a temperature of from 600° to 1000° C. to effect a continuous interaction between said steam and hydrocarbons, and passing about said spaces a stream of gas sufficiently hot to set up and maintain said temperature.

4. In the process for the production of gases containing hydrogen by the catalytic conversion of hydrocarbons by steam at elevated temperatures, the step which comprises continuously passing the said initial materials over a catalyst consisting of nickel, activated with alumina, arranged in a vertical space having a length very large in proportion to its cross-sectional area and confined by a surface consisting of a highly alloyed steel which is externally heated to a temperature from 600° to 1000° C.

GUSTAV WIETZEL.
WILHELM HALLER.
WILLIAM HENNICKE.